United States Patent Office 2,988,452
Patented June 13, 1961

2,988,452
TREATMENT OF FRESH MEAT
Hugh G. Cameron, Blue Island, Ill., assignor to W. R. Grace & Co., Cambridge, Mass., a corporation of Connecticut
No Drawing. Filed Mar. 3, 1959, Ser. No. 796,739
8 Claims. (Cl. 99—194)

This invention relates to the treatment of fresh meat, notably commercial grades of beef, lamb and lamb cuts, and provides a rapid and efficient method of tenderizing the same.

In accordance with the invention, not only choice and prime grade beef cuts and lamb cuts are satisfactorily aged but also economy cuts and low grade cuts as well. The latter have been difficult to tenderize and frequently cannot be aged by hanging even for an extended period of time, as is true of the choice and prime grade cuts, because of lacking the fat cover to protect the cuts while hanging. By the present methods, these economy and low grade cuts may now be aged or tenderized successfully in about 20 to 72 hours, which is of immeasurable value to packers, purveyors and restaurant operators.

Presently, millions of tons of beef and lamb are aged each year by packers, purveyors and at central chain store warehouses, requiring expensive refrigerated holding space for periods varying from seven to twenty-one days. Even though humidity and conditions conducive to bacterial and mold growth are closely controlled, trim loss each year runs into millions of dollars. Again, inventory control of various primal cuts requiring different aging periods is difficult during periods of high demand on the supplier and in many instances various cuts in long supply must be sacrificed at lower than market prices. The present invention seeks to overcome these problems and provides a method wherein the lamb and beef are subjected to accelerated aging with the end results being favorable in respect to tenderness, flavor, and moisture. The color return is satisfactory, although the original color migration in lamb is somewhat less than in beef. Hence, when there is less recovery necessary to return it to the original bloom, the outside fat bleaches to a desirable whiteness after the chill period is completed. It was found that lamb so handled actually improved in package appearance within 24–36 hours after treatment.

The breakdown of the cellular tissue structure of meat which is characteristic of aging or tendering is brought about by enzymic action, which is controlled by two principal factors, namely, time and temperature. In this invention, the enzymic action in fresh red meat is greatly accelerated by increased heat while, at the same time, bacterial and mold growth is held at a low level. Hence, the above-mentioned problems of the meat industry are appreciably minimized, and tremendous savings are effected.

From the foregoing brief explanation, it will be appreciated that it is the primary object of the invention to age fresh meat, e.g., three to five days from the kill, by a procedure which includes a high temperature treatment of the red meat for a relatively short time under controlled temperature conditions. Thus, the present invention will, for example, tenderize the meat within 20–72 hours (depending on the temperature of treatment, thickness and size of cut and tenderization desired), and the state of tenderization is equal to that obtained by 10 to 21 days conventional hang age. In referring to commercial grades of beef and lamb, it is intended to include all of the known cuts whether boneless or bone-in and primal and choice or lower grade beef cuts. In all cases, the products treated by this invention are nice appearing and attractive in all respects and their color and taste upon cooking is in no way imparied and usually is appreciably improved. In addition, products treated in accordance with this invention have a substantial shelf life of 14 days or more, which is, of course, highly satisfactory.

In carrying out the invention, fresh meats, e.g., meat three to five days from kill, are cut into prime cuts and the usual lower grade cuts, either boneless or bone-in. These red meat cuts are each then bagged in shrinkable, plastic, flexible, transparent bags of Saran film, biaxially stretched irradiated polyethylene film, or some similar film. Each bag is subjected to vacuum to remove the air, twisted, and clipped to seal the same, and then shrunk upon the meat product by a brief immersion in hot water of approximately 200° F. The foregoing steps are well known in the art and follow the highly accepted "Cryovac Process."

Thereafter, the bags containing the red meat are introduced to a box or temperature room having a temperature of approximately 60° to 68° F. at the time the meat is introduced. The meat is held in the box or temperature room for about 24 to 48 hours until its internal temperature as well as its external temperature is about 60° to 68° F. Thereafter, the bagged products, either in the aforesaid temperature room or in another room or chamber, are subjected to a hard chill temperature at about +15° F. to −20° F., and retained under these temperature conditions until a crust freeze about ⅛ inch thick is observed. Since different meats may require longer or shorter times at the hard chill temperature, the time cannot be precisely indicated, but it is relatively short and generally insufficient to reduce the internal temperature of the meat to 40° F. Obviously, the time lag between internal and external temperature is due primarily to the thickness of meat. Usually, the frozen crust appears to form in about 15 to 45 minutes.

The units having the frozen crust when removed from the hard chill temperature room or chamber have an internal temperature greater than about 40° F. and are kept in a holding cooler having a temperature of about 34° F. to 40° F. The meats are allowed to remain in this holding cooler or are removed therefrom for shipment.

The cooling after the accelerated aging treatment may be conducted in a normal 30° to 40° F. cooler. The crust freezing usually has some economic advantages because of shorter time required in the cooler, or because of greater stiffness, the product could be packaged sooner in the final carton ready for storage or distribution.

The foregoing operation comprises a total of about 36 hours as compared with conventional aging and tenderizing procedures which, to obtain anywhere near comparable results, require from 10 to 21 days hang age.

Throughout the operation just described, the original vacuum package remains intact and provides an attractive saleable product of high quality.

EXAMPLE 1

Eight low Choice Grade bone-in sirloin strips were obtained from a three-day kill. These strips were individually split into two pieces so as to provide control sample and afford similar test samples for treatment by the present invention.

The latter were bagged, vacuumized, treated, closed with an aluminum clip, and passed through a hot water shrink tunnel at approximately 195° F., e.g. according to the usual "Cyrovac Process." The test samples of the bagged meat had an internal temperature of 37° F. and were taken to a room in which the temperature was maintained at 68° F. while the other half, namely the control samples, was placed on a stationary rack in the usual 36° F. cooler room and held as controls. The bagged meat was removed from the high temperature room after a total of about 41 hours (an additional five hours having been allowed in order to raise the internal temperature of the meat from about 37° F. to about 68° F.). The internal temperature of the strips at the end of the 41 hours was 68° F. The strips were immediately removed from the high temperature room and transferred to a blast freezer room having a temperature of 0° F. The product was checked every fifteen minutes in order to determine as closely as possible the exact moment when a crush freeze of about 1/8 inch thick was reached. This took approximately one hour. The meat was pliable to the touch beneath the outside crust when the product was removed from this freezer. These bagged test products were then placed in the said 36° F. cooler alongside of the control samples which had remained in this cooler room during the accelerated aging process.

The following day the respective products were cooked under a gas broiler for six and one-half minutes each, three inches from the flame. A set of two steaks, including one test steak and one control steak, was selected with muscle structure which was as nearly identical as possible. The consensus of opinion of a test panel was that the accelerated aged steak was obviously much more tender than the control sample, and this was true with respect to all of the treated and controlled samples. The tendering effect of the samples treated in accordance with this invention was especially noticeable on the tail or flank ends of the steaks, and members of the panel were able to select the steak treated in accordance with the invention without hesitation on a blind sampling basis.

The foregoing example was repeated with the high temperature room at about 60° F., at about 67° F., at about 72° F., and at about 75° F., respectively, with satisfactory results, but it is believed best to keep the temperature from going above 70° F., i.e. preferred conditions are to maintain the high temperature chamber within plus or minus 2 of 66° F. and a range of about 60° F. to 75° F. At the lower temperature, a little longer is required to accomplish the end result but an appreciable decrease in aging time is still obtained.

In the foregoing example, the hot water in the shrink tunnel had a temperature of 195° F. but the invention is operative when the temperature of the water is between about 190° F. and 210° F., about 195° F. to 200° F. being preferable.

Also, the invention was carried out according to the above example with the blast freezer room at temperatures varying from 0° F. to −5° F. with equally satisfactory results, and, in fact, satisfactory results were obtained with the foregoing example when the chill temperature was as low as −10° F. and as low even as −20° F.

The foregoing example was also carried out by maintaining the meat in the high temperature chamber for about 48 hours, as well as 40 and 44 hours.

While it has been indicated that the bagged meat was heated from its initial temperature of 37° F. to 68° F. in the high temperature chamber, the meat sometimes was heated to about 68° F. and then introduced into said high temperature chamber which, as stated already, has a temperature of 68° F.

It has been described that the frozen crust obtained in the chill chamber is about 1/8 inch thick which is approximate, of course, in that it may vary to the extent of being a little thicker or a little thinner, but about 1/8 inch thickness is preferred. In this connection, while the foregoing example indicates that the crust was formed in approximately one hour, this time may be less in the case of some cuts of meat and lower temperatures and may be a little longer with certain cuts and higher temperatures. The important consideration, however, is that a frozen crust be formed about 1/8 inch thick.

It is preferred to make visual observations periodically by reason of the nature of the meat and also to some extent because of the particular temperature in the blast freezer room.

EXAMPLE 2

One full bone-in sirloin butt was obtained three days after kill date. The bottom butt was removed and cut into two pieces; the top butt bone-in was cut into two pieces. One piece of each cut was Cryovac packaged, heated to have an internal temperature of about 68° F., and placed in a room having a controlled temperature of 68° F. for 48 hours. The other two pieces were held in the laboratory cooler at 38° F. as a control. After a 48 hour holding period at 68° F., the Cryovac packaged cuts were placed in the 38° F. laboratory cooler until chilled through to an internal temperature of 40° F.

The Cryovac cuts had good color after opening, and a taste test proved that the Cryovac packaged cuts were more tender than the control cuts and had an acceptable taste.

*Shrink and trim loss*

(1) Shrink:

|  | Initial Weight | Final Weight | Loss |
|---|---|---|---|
| Cryovac: |  |  |  |
| Top Butt (bone-in) | 7 lbs. 5½ oz | 7 lbs. 4 oz | 1½ oz. |
| Bottom Butt (boneless) | 2 lbs. 14 oz | 2 lbs. 13½ oz | ½ oz. |
| Control: |  |  |  |
| Top Butt (bone-in) | 7 lbs. ¼ oz | 6 lbs. 10 oz | 6 oz. |
| Bottom Butt (boneless) | 3 lbs. 3½ oz | 2 lbs. 14½ oz | 5 oz. |

(2) Useable trim loss:
  Cryovac cuts _____ None
  Control cuts _____ 1 lb. 15 oz.
(3) Total loss (shrink and trim):
  Cryovac cuts _____ 2 oz.–1.3%
  Control cuts _____ 2 lb. 10 oz.–24.6%

EXAMPLE 3

Control cuts of (a) Choice Rib, (b) Choice Trimmed Loin, and (c) Choice Round were hung in the laboratory cooler at 36°, 37°, and 38° F. and aged in the conventional manner at these respective temperatures. All cut surfaces were covered with 60 gauge Cryovac film to inhibit drying.

Cryovac test products of (a) Choice Rib, (b) Choice Trimmed Loin, (c) Choice Trimmed Short Loin, and (d) Choice Round, were treated as follows:

The rib was cut in two pieces chine bone-in, 10-inch rib, the trimmed loin boned into a top butt, strip (cut in two pieces) and a long tender. The round was fabricated into rump, top and bottom rounds which were split in two pieces each for testing purposes. These products were packaged in Cryovac bags, evacuated and shrunk in the usual manner as described above. The Cryovac packaged cuts were divided into three groups and subjected to 68° F. temperature for:

Group 1—24 hours
  Group 2—36 hours
  Group 3—48 hours

After heat treating these were placed in the said laboratory cooler using temperatures of 36°, 37°, and 38° F., respectively. The packages were then opened at varying intervals as follows:

|  | 1st Opening, days | 2nd Opening, days | 3rd Opening, days |
|---|---|---|---|
| Age From Kill: |  |  |  |
| Cryovac | 3 | 7 | 11 |
| Control | 10 | 14 | 18 |

The following conclusions were drawn:
(1) Meat handled in this manner, especially some of the muscles which are inherently tough (top and bottom round, for example), were considerably more tender at three days than the conventionally hung controls at 10 to 14 days.

(2) Cryovac treated products were juicier than controls in all cases.
(3) The products had an acceptable taste.
(4) The color return was good.

EXAMPLE 4

One rib, one trimmed loin, one round was obtained and handled as follows: Rib split into two pieces; loin boned into top butt, long tender and shell loin; round into rump, top and bottom round. This product was Cryovac packaged and treated at 68° F. for 36 hours, removed from treatment boxes, placed in the freezer until ⅛ inch crust formed as in Example 1, and then placed in 36° F. temperature cooler.

The product was opened at 7, 10, 14 and 21 day intervals following treatment and evaluated for tenderness, juiciness, general condition, bacterial count, and color return. All product was in excellent condition upon open-at the 7, 10, 14 and 21 days holding periods.

The accelerated treatment temperature of 68° F. for 36 hours was ample to tenderize the product better than conventionally aged product hung for 21 days. Bottom rounds were sliced and broiled in the laboratory kitchen. They were tender and juicy.

In the appended claims, temperature in the high temperature chamber is described as "about 68° F. to 75° F." and is intended to cover a range with variations up or down which are operative to tenderize or age the meat.

The procedures described in the foregoing examples were followed with lamb and lamb cuts. The lamb was handled the same as the beef and when subjected to the accelerated aging as recited above, the end results were identical in respect to tenderness, flavor and moisture. The color return is satisfactory, although the original color migration in lamb is somewhat less than with the beef. Hence, when there is less recovery necessary to return it to the original bloom, the outside fat bleaches to a desirable whiteness after the chill period is completed. It was found that lamb so handled actually improved in package appearance within 24–36 hours after treatment.

The operations in the high temperature chamber and in the chill room as well as the holding cooler are all conducted under atmospheric pressure, i.e. with air present in the respective rooms or boxes as the case may be. While it has been described above that the meat, following accelerated aging, is held in the cooler at 36 to 40° F., the meat is sometimes frozen for a longer period of storage, e.g. at about 15° F. to 40° F. Public storage freezers are usually at about 15° F.

Throughout this specification, it is to be understood that the name "Cryovac" is a registered trademark.

While reference has been made above to "Cryovac pouches or bags," the invention is equally successful when roll film is employed to wrap the fresh meat. Thus, we have wrapped the fresh meat in film made from saran (polyvinylidene chloride) and biaxially stretched irradiated polyethylene (Type "L"), as well as Type "L" coated with saran and all proved successful following procedure of the foregoing examples, in connection with both lamb and beef. The range in moisture vapor transmission covered by these films was from .50 to 1.50 grams, per 100 square inch of film having one mil thickness, measured over a 24 hour period at 100 F. and relative humidity of 100%. The oxygen permeability range covered by these films was from 50 to 500 cubic centimeters measured on one square meter having one mil thickness over a 24 hour period at atmospheric pressure and a temperature of 21° C.

The invention is usefully carried out with bags as described, as well as with film wrapping, the latter being sealed with the same manner as a customary overwrapped package. Reference to "package" herein is therefore intended to cover both bags and film wraps, i.e. a package wrapped in such manner as to produce an air free, plastic, skin tight covering over the entire surface of the meat.

What is claimed as new is:

1. The method of aging fresh meat comprising holding the meat at about 60° F. to 75° F. for from about 20 to about 72 hours in a sealed plastic container from which the air has been evacuated and the container heat shrunk about the meat and thereafter cooling the meat to an internal temperature of about 15° F. to 40° F.

2. The method according to claim 1 wherein the meat having an internal temperature of about 60° F. to 75° F. while in said sealed plastic container is subjected to a low temperature until a thin frozen crust forms on the surface of the meat, and thereafter cooling the meat to an internal temperature of about 15° F. to 40° F.

3. The method according to claim 2 wherein the plastic container is selected from the group consisting of polyvinylidene chloride and biaxially stretched irradiated polyethylene.

4. The method according to claim 2 wherein the frozen crust is formed by subjecting the meat to a temperature between about 0° F. to —20° F.

5. The method according to claim 2 wherein said crust is about ⅛ inch thick.

6. The method according to claim 5 wherein the meat is subjected to a temperature between about 0° F. to —20° F. until said frozen crust is formed.

7. The method of aging fresh meat which has been precooled comprising raising said cooled meat to a temperature between about 60° F. and 75° F. and holding the meat at said elevated temperature for from about 20 to about 72 hours while in a sealed plastic container from which the air has been evacuated and the container heat shrunk about the meat and thereafter cooling the meat to an internal temperature of about 15° F. to 40° F.

8. An aged packaged meat product prepared by the method of claim 2.

References Cited in the file of this patent

UNITED STATES PATENTS

| | | |
|---|---|---|
| 2,492,308 | Menges | Dec. 27, 1949 |
| 2,528,079 | Reiman et al. | Oct. 31, 1950 |
| 2,713,002 | Williams | July 12, 1955 |
| 2,779,681 | Sell et al. | Jan. 29, 1957 |
| 2,816,836 | Williams | Dec. 17, 1957 |
| 2,865,765 | Allen | Dec. 23, 1958 |
| 2,956,886 | Baush | Oct. 18, 1960 |